Patented Jan. 5, 1943

2,307,092

UNITED STATES PATENT OFFICE 2,307,092

STABILIZED ARTIFICIAL RESINS

Victor Yngve, Lakewood, Ohio, assignor to Carbide and Carbon Chemicals Corporation, a corporation of New York No Drawing. Application November 9, 1940,
Serial No. 365,008

11 Claims. (Cl. 260—86)

The invention relates to stabilized artificial resins containing combined halogen, and to compositions containing them. It is particularly concerned with new and improved stabilizing materials which show definite advantages in preventing deterioration at elevated temperatures of vinyl resins containing combined halogen.

As synthetic resinous bodies, such vinyl resins are well known in the art, and their valuable properties as components of plastic compositions of various sorts have been recognized. In the compounding and processing of such resins into molded and extruded articles, as well as in coating compositions which require baking, it is necessary to subject the plastics to a certain amount of heating. Under such conditions, and at elevated temperatures which may be encountered in normal usage, a tendency toward deterioration commonly occurs. To prevent such decomposition, it has, therefore, been considered essential with known types of vinyl resins to incorporate therewith additive materials adapted to exert a stabilizing action, and numerous compounds have been suggested for this purpose.

Improvements afforded by this invention are especially applicable to vinyl ester resins, of the type produced by the polymerization of vinyl halides. For the purpose of this invention, the vinyl resin to be stabilized may be considered as a halogen-containing derivative of polyvinyl alcohol in which some or all of the hydroxyl groups are replaced by other radicals. The term "vinyl resin" also includes derivatives of polyvinyl alcohol in which some of the hydrogen atoms have been replaced by other substituents, such as additional chlorine. This may be done by after-chlorinating the resin or by starting with a chlorinated vinyl derivative, such as vinylidene chloride. A preferred type of vinyl ester resin is formed by the conjoint polymerization of mixtures of vinyl halides, notably vinyl chloride, with vinyl esters of aliphatic acids as described in U. S. Patent 1,935,577 to E. W. Reid. Among these latter resins, the conjointly polymerized product of vinyl chloride and vinyl acetate containing about 60% to 95% of vinyl chloride in the polymer, and having an average molecular weight of from 5,000 to 20,000, as estimated from the specific viscosity of dilute solutions according to Staudinger's method, is especially susceptible to stabilization by the compounds hereinafter described. In its broader aspects, the invention is applicable to any vinyl resinous material containing halogen attached to an acyclic carbon atom which is unstable to heat. These vinyl resins are those in which the halogen is attached to a carbon atom not a member of any ring in the unpolymerized vinyl compound. Such materials include rubber hydrochloride, polymerized chlorobutadiene and other polymers of unsaturated organic compounds having halogen attached to an acyclic carbon atom of the type represented by vinyl chloride, vinylidine chloride, and chlorobutadiene.

In accordance with this invention, I have found that the organo-metallic compounds of tin, particularly carboxylic aliphatic and aromatic acid salts of both alkyl and aryl derivatives of this metal, will function as excellent stabilizers for halogen-containing vinyl resins, and when intimately dispersed therein, will provide plastic compositions of substantially improved resistance to heat deterioration. In the class of aliphatic carboxylic acid salts, both the lower and the higher fatty acids are effective as the acid radical of the organo-metallic salt. Of the lower aliphatic acids, both monobasic and dibasic acids may be used although, in general, monobasic acids, such as acetic, propionic, butyric or valeric acids, are preferred. More specifically, the organo-metallic tin salts of the aliphatic acids containing less than four carbon atoms, in particular acetic and propionic acids, are especially effective in vinyl resin compositions for coating purposes. Typical higher fatty acids which may constitute the carboxylic acid radical of the organo-metallic tin salt are saturated acids, such as stearic, palmitic, undecylic or lauric acids, or unsaturated acids as represented by oleic, linoleic, and ricinoleic acids.

The organic group of the organo-metallic tin compound, other than the carboxylic acid salt radical, may be any of the typical hydrocarbon radicals. Of the alkyl radicals, those containing three or more carbon atoms, as included in the propyl, isopropyl, butyl, isobutyl, tertiary butyl, and the various amyl groups, are particularly desirable. As aryl derivatives those containing phenyl, tolyl, xylyl and naphthyl groups are typical. A mixed hydrocarbon grouping in the compounds is also appropriate, which may include two or more different alkyl radicals in the molecule or mixed aryl and alkyl groups.

Representative specific compounds especially effective in their stabilizing action for vinyl resins are the following:

Dibutyl tin basic acetate
Dibutyl tin diacetate
Dibutyl tin oleate
Dibutyl tin laurate
Tributyl tin laurate
Tributyl tin oleate
Tributyl tin stearate
Diphenyl tin oleate
Diphenyl tin stearate All of the above and related compounds are intended to be included within the broader scope of the invention and within the classification which may be defined as organo-metallic tin salts of carboxylic acids. These compounds may be prepared by reacting alkyl or aryl magnesium chlorides with stannic chloride to give alkyl or aryl tin chloride which is then hydrolyzed to alkyl or aryl tin hydroxide. The carboxylic acid salts are prepared by fusion of this material with the desired carboxylic acid. In certain cases, precaution should be taken to avoid the presence of metallic tin in the compounds, since, in the metallic form, tin tends to catalyze the thermal decomposition of some of the vinyl halide resins.

The important and valuable properties in these new stabilizers include the fact that in concentrations adequate to obtain suitable stability they impart no color to vinyl resin compositions, and can thus be used satisfactorily in either transparent or ordinary white films. They also permit the production of clear and colorless vinyl resin sheet material which may be either tough and rigid or highly plasticized. The compounds furthermore have very little, if any, adverse effect on the water resistance of thin films, presenting a combination of properties quite unique among stabilizers suitable for use with halogen-containing vinyl resins. Another advantage resides in the resistance of the stabilizers to discoloration in the presence of hydrogen sulfide, which makes possible the satisfactory application of vinyl resin plastics to uses requiring contact with sulfur compounds.

The amounts of stabilizer necessary to effect desirable heat stability is within the range heretofore found suitable with other materials, varying usually from about 0.5% to about 5.0% by weight of the resin. In coating compositions containing vinyl resins, for example, the compatibility of the stabilizer with the resin must also be considered, and with dibutyl tin diacetate or dibutyl tin basic acetate, for example, the preferred amounts will usually be not above about 3% by weight of the resin. With a resin produced by conjoint polymerization of vinyl chloride and vinyl acetate, containing about 86% to 88% vinyl chloride in the polymer, and having an average molecular weight of from about 9,000 to 10,000, in a suitable solvent to form a lacquer composition, these particular acetate stabilizers substantially improve the stability of a baked film in amounts of from about 0.5% to 2.0% by weight of the resin. Such a film also shows, on hot water tests and exposure to steam, a superior resistance to "blush" and whitening.

Many tests have been made proving the effectiveness of these new stabilizers in plastic compositions. Employing a resin formed by conjoint polymerization of vinyl chloride and vinyl acetate, containing about 87% vinyl chloride in the polymer, and having an average molecular weight of from about 8,000 to 12,000, the stabilizer in quantities of about 1.0% by weight of the resin produces a stable plastic which will remain clear at elevated temperatures employed in subsequent processing, and under heat tests at 135° C. the resistance to deterioration, as evidenced by discoloring or blackening of the resin, is very good. For example, 1% by weight of diphenyl tin stearate or tributyl tin stearate in this vinyl resin maintained a clear resin of good color for an hour at 135° C., whereas a similar resin without the stabilizer blackened in fifteen minutes when heated at the same temperature. With 2% of either of these compounds the heat stability at 135° C. was increased to two hours, and larger amounts of the stabilizer further improve the heat stability. Clear films of the stabilized resin have shown no apparent decomposition when baked on steel panels for thirty minutes at a temperature of 350° F., whereas a film of similar resin, but without the stabilizer, will blacken and decompose entirely in five minutes under the same conditions.

In compounding the stabilizer with the resin, methods heretofore known may be employed which will effect an intimate dispersion throughout the resin mass. Solvents suitable for the resins formed by conjointly polymerizing vinyl chloride with vinyl acetate will dissolve some of these new stabilizers, and with the acetate salts specifically mentioned, for example, no milling is necessary to obtain their suitable dispersion in preparing a lacquer formula. For various plastic compositions there may be included any of the common solvents, plasticizers, pigments, and other modifying materials without detrimental effect upon the heat stability afforded by these new stabilizers.

Modifications of the invention other than as specifically described herein will be evident and are included within the scope of the invention as defined in the appended claims. This application is a continuation-in-part of both my applications Serial No. 215,412, filed June 23, 1938, now Patent No. 2,267,778, and Serial No. 309,573, filed December 16, 1939, which in turn are continuations-in-part of my application Serial No. 118,568, filed December 31, 1936, now Patent No. 2,219,463.

I claim:

1. A thermally stable vinyl resin composition including intimately dispersed therein a stabilizing material comprising an organo-metallic tin salt of a carboxylic acid, said vinyl resin having halogen attached to an acyclic carbon atom.

2. A thermally stable vinyl resin composition including intimately dispersed therein a stabilizing material comprising an organo-metallic tin salt of an aliphatic acid, said vinyl resin having halogen attached to an acyclic carbon atom.

3. A thermally stable vinyl resin composition including intimately dispersed therein a stabilizing material comprising a hydrocarbon tin salt of an aliphatic acid, said vinyl resin having halogen attached to an acyclic carbon atom.

4. A thermally stable vinyl resin composition including polymerized vinyl halide containing intimately dispersed therein a stabilizing material comprising an alkyl tin salt of an aliphatic acid.

5. A thermally stable vinyl resin composition including polymerized vinyl halide containing intimately dispersed therein a stabilizing material comprising an aryl tin salt of an aliphatic acid.

6. A thermally stable resinous composition comprising a vinyl resin substantially identical with that resulting from the conjoint polymerization of vinyl chloride with a vinyl ester of an aliphatic acid and a stabilizing material intimately dispersed therein comprising an organo-metallic tin salt of a carboxylic acid.

7. A thermally stable resinous composition comprising a vinyl resin substantially identical with that resulting from the conjoint polymerization of vinyl chloride with a vinyl ester of an aliphatic acid and a stabilizing material intimately dispersed therein comprising a hydrocarbon tin salt of an aliphatic acid.

8. A thermally stable resinous composition comprising a vinyl resin substantially identical with that resulting from the conjoint polymerization of vinyl chloride with a vinyl ester of an aliphatic acid and a stabilizing material intimately dispersed therein comprising a dialkyl tin salt of an aliphatic acid.

9. A thermally stable resinous composition comprising a vinyl resin substantially identical with that resulting from the conjoint polymerization of vinyl chloride with a vinyl ester of an aliphatic acid and a stabilizing material intimately dispersed therein comprising a diaryl tin salt of an aliphatic acid.

10. A thermally stable resinous composition comprising a conjoint polymer of vinyl chloride with vinyl acetate intimately combined with dibutyl tin laurate.

11. A thermally stable resinous composition comprising a conjoint polymer of vinyl chloride with vinyl acetate intimately combined with dibutyl tin acetate.

VICTOR YNGVE.